May 6, 1941.  G. A. KIMBER  2,241,205
SUPPORTING DEVICE FOR EYEGLASSES, SPECTACLES, AND THE LIKE
Filed Jan. 13, 1939
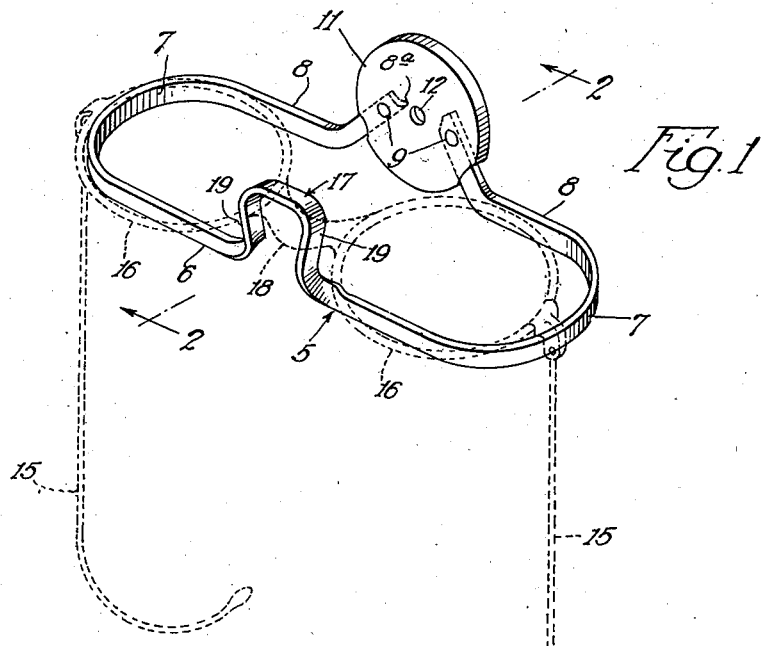
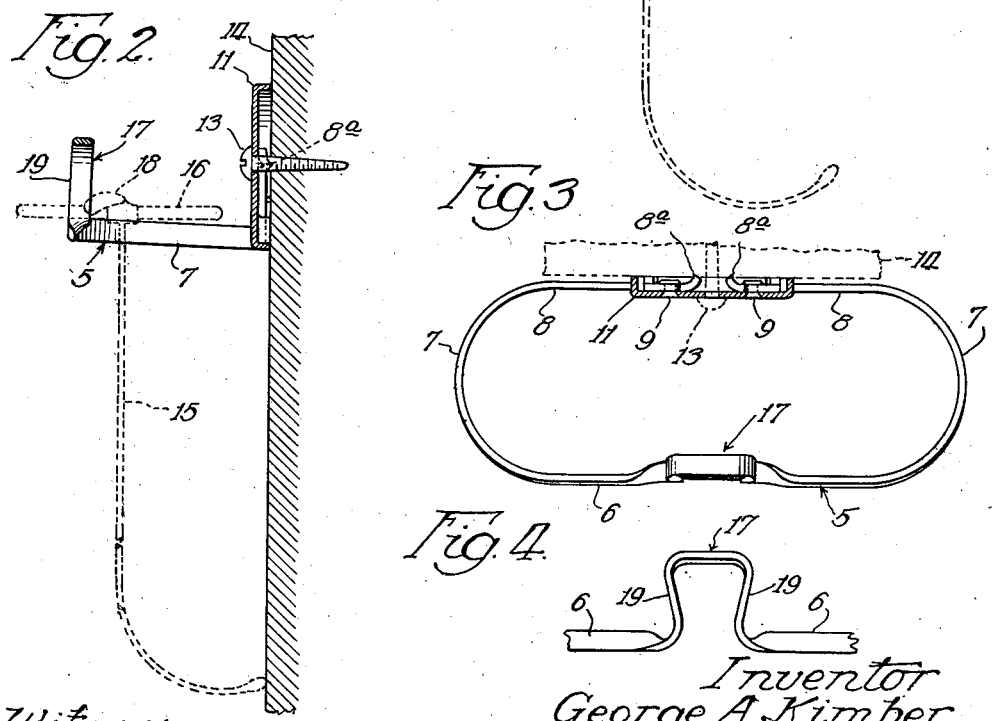
Witness:
V. Siljander
Inventor
George A. Kimber
By: Hill + Hill, Attys.

Patented May 6, 1941

2,241,205

UNITED STATES PATENT OFFICE 2,241,205

SUPPORTING DEVICE FOR EYEGLASSES, SPECTACLES, AND THE LIKE

George A. Kimber, Chicago, Ill.

Application January 13, 1939, Serial No. 250,691

2 Claims. (Cl. 248—300)

This invention relates to supporting devices, and particularly to a device of novel construction and arrangement for receiving and effectively supporting eyeglasses or spectacles in a safe and efficient manner.

Persons required to wear eyeglasses or spectacles are familiar with the difficulties encountered in properly taking care of and protecting spectacles against damage and temporary loss, particularly when the spectacles are removed while shaving, bathing and upon retiring.

Frequently spectacles have been placed on dressers, in medicine cabinets and on wash stands of bath rooms, and in various other carelessly selected places, always with the attendant danger of being overlooked and damaged by setting something on the glasses or by brushing them onto the floor.

One object, therefore, of the present invention is to provide a supporting device of novel construction and arrangement, which may be conveniently mounted on and secured to a suitable support in a bathroom, bedroom or other desired location, preferably, out of danger possible damage to spectacles placed thereon, and where the spectacles may be readily found by reason of having a regular and definite resting place.

Another object of the invention is to provide a supporting device of novel construction and arrangement whereby the lenses of spectacles or the like are protected against scratching by contact of the lenses with portions of the device.

Another object of the invention is to provide novel means operatively related to the supporting device for retaining the spectacles against accidental displacement with respect thereto.

A further object of the invention is to provide a supporting device for the purpose described, which is of pleasing appearance, economical to manufacture and efficient in its operation.

A still further object of the invention is to improve devices of the character described in sundry details hereinafter referred to and particularly pointed out in the appended claims.

One embodiment of the present invention is shown for illustrative purposes in the accompanying drawing, in which:

Fig. 1 is a perspective view of my improved supporting device, and illustrating, in dotted lines, a pair of spectacles supported thereon;

Fig. 2 is a transverse sectional elevational view of the structure illustrated in Fig. 1, and taken substantially as indicated by the line 2—2 thereof;

Fig. 3 is a plan view, partly in section, of the supporting device illustrated in Figs. 1 and 2; and Fig. 4 is a fragmentary front elevational view of a portion of the structure forming a part of the present invention.

The illustrative embodiment of the present invention comprises an apertured body member shown in the present instance as an elongated, horizontally disposed inclosure, and indicated, as a whole, by the numeral 5, the said body member having a front portion 6 and rounded end portions 7, and is shown, in the present instance, as formed of a relatively narrow strip of material bent to form the front and end portions 6 and 7, respectively, of the body member, the end portions of the strip being bent, preferably, into substantial alignment to form a rear side portion 8 of the body member and adapted to be secured by suitable means such as spot-welding, or by rivets 9, as shown, to a flanged plate or shroud 11 having an aperture 12 formed therein preferably, adjacent its central portion and adapted to receive fastening means shown, in the present instance, as a screw 13, by which the device may be readily and conveniently secured to a suitable support such, for example, as a wall 14 of a bathroom or the like.

For maintaining the body member 5 in proper spectacle-supporting position, and against rotation about the fastening screw 13, the adjacent end portions of the strip, forming the side portion 8 of the body member 5, are shown, in the present instance, as bent laterally to provide prongs 8a adapted to project and bite into the surface of the support 14, into which the fastening means or screw 13 is driven.

The body member 5 of the supporting device is shown, in the present instance, as of elongated hollow or apertured form preferably of a length slightly less than the distance between the temples 15 of a pair of spectacles, and of a width substantially equal to the height of the spectacle bows 16 to provide a structure on which a pair of spectacles may be readily positioned in the manner shown by dotted lines in Figs. 1 and 2 of the drawing, the apertured arrangement of the body member 5 forming an open portion within the margins of the body member, and providing assurance against scratching of the lenses of the spectacles, which might otherwise result from contact with portions of the device.

For retaining the spectacles against accidental displacement with respect to the body member 5, when in position thereon, the front portion 6, preferably, is provided with a vertically disposed or upwardly extending retaining means indicated as a whole by the numeral 17 and shown, in the present instance, as formed integrally with the front portion 6 of the body member 5 and adapted to co-act with the bridge portion 18 of the spectacles in a manner to prevent accidental displacement thereof with respect to the supporting device. The body member 5 is shown in the present instance (Fig. 2) as tilted slightly from the horizontal and the retaining means 17 is shown as inclined inwardly or rearwardly as clearly illustrated in Figs. 2, 3, and 4, and the sides 19 of the retaining means 17 are shown as diverging in an upwardly direction in the manner clearly illustrated in Figs. 1 and 4, thereby providing additional means for insuring against accidental displacement of the spectacles with respect to the body member 5.

It will be observed from the foregoing description that the present invention provides a novel construction and arrangement in a support for eyeglasses, spectacles, or the like, which may be readily and conveniently positioned in a bathroom, bedroom, or other desired location to provide a definite place for spectacles to assist in locating them when wanted, and provides an efficient and practical structure for protecting eyeglasses or spectacles positioned thereon against damage, and against accidental displacement with respect thereto.

Obviously, the present invention is not limited to the precise construction and arrangement shown and described as the same may be variously modified. Moreover, all the features of the invention need not be used conjointly as the same may be used to advantage in variously different combinations and subcombinations.

What I claim as new and desire to secure by Letters Patent is:

1. A supporting device for eyeglasses comprising a strip of material bent to form an apertured, horizontally disposed, open body member, means at one side of said body member intermediate the ends thereof for securing the body member to a support, and retaining means formed integrally with said body member adjacent the central transverse portion thereof for retaining a pair of eyeglasses positioned on said body member against accidental displacement with respect thereto.

2. A supporting device for eyeglasses comprising a strip of material bent to form an elongated, horizontally disposed, apertured body member, securing means at one side thereof and operatively related to the end portions of said strip for securing said body member in desired position to a support, upwardly extending retaining means formed integrally with the material of said body member adjacent the central transverse portion thereof and at the opposite side of said body member, said retaining means having upwardly diverging side portions for retaining a pair of eyeglasses positioned on said body member against accidental displacement with respect thereto, and prongs formed adjacent said end portions of the strip and engageable with said support for maintaining said body member against angular displacement with respect to the support.

GEORGE A. KIMBER.